Figure 1:
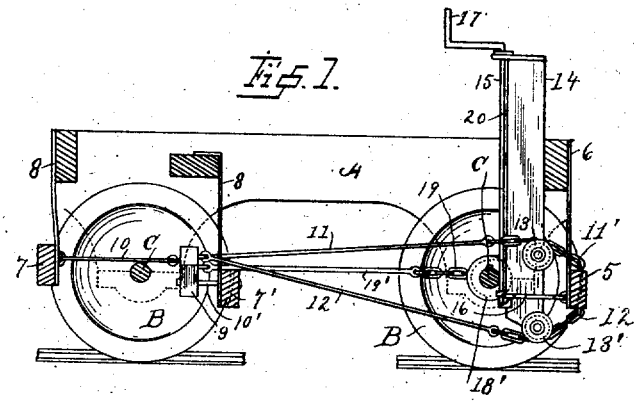

No. 11,821. Reissued Apr. 10, 1900.

J. N. & N. P. ZECH.

BRAKE.

(Application filed Feb. 12, 1900.)

Witnesses:
F. A. Ott.
C. L. Beech.

Inventors.
John N. Zech
Nicholas P. Zech
By Erwin & Wheeler
Attorneys.

UNITED STATES PATENT OFFICE.

JOHN N. ZECH AND NICHOLAS P. ZECH, OF MILWAUKEE, WISCONSIN.

BRAKE.

SPECIFICATION forming part of Reissued Letters Patent No. 11,821, dated April 10, 1900.

Original No. 640,069, dated December 26, 1899. Application for reissue filed February 12, 1900. Serial No. 5,028.

*To all whom it may concern.*

Be it known that we, JOHN N. ZECH and NICHOLAS P. ZECH, citizens of the United States, residing at Milwaukee, county of Milwaukee, and State of Wisconsin, have invented new and useful Improvements in Brakes, of which the following is a specification.

Our invention relates to improvements in brakes of a class that are adapted to be used on railway-cars, and includes the means (forming a part of the brake) by which the brake-beams are applied to the wheels of a car.

The object of our invention is to provide means whereby the twisting frictional pressure of a car-wheel upon a brake applied thereto may be utilized in the application of other brakes, either independently or as an auxiliary to other brake-applying mechanism.

In the drawings we have shown our invention applied to a simple form of four-wheeled truck.

Figure 2:
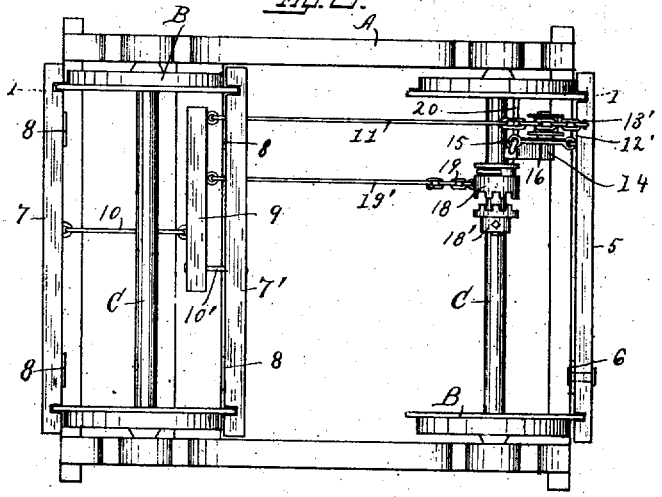
Figure 3:
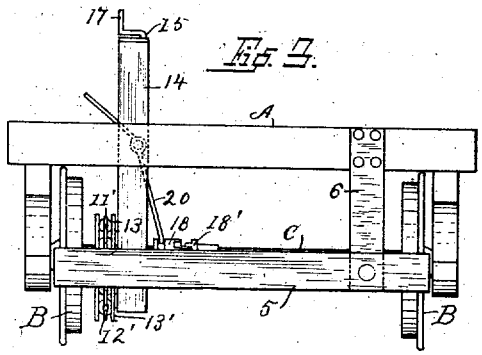

Figure 1 is a sectional view, major section, drawn on line 1 1 of Fig. 2. Fig. 2 is a plan view of the truck equipped with our invention, and Fig. 3 is an elevation of that end at which the vertical brake-actuating shaft is located.

Like parts are identified by the same reference letters and figures throughout the several views.

In the drawings, A is the frame of the truck, B B the wheels, and C C the axles, the latter being mounted to revolve with the wheels in suitable bearings in the frame.

A brake-beam 5 is pivotally supported from the truck-frame by means of a flexible or elastic hanger 6, which is adapted to coöperate with the brake-actuating mechanism, hereinafter described, in holding the beam in such a position that it or any suitable brake-shoes located thereon may be drawn or pushed forcibly against the wheels. This beam 5 will for convenience be hereinafter termed the "actuating-brake." Other brake-beams 7 7′ are also provided, these being suitably arranged with reference to the car-wheels and supported by hangers 8 8, similar in character to the hanger 6. We have illustrated these beams 7 7′ as located on opposite sides of a set or pair of car-wheels. A lever 9 is connected to the brake-beam 7 by a rod 10 and to the brake-beam 7′ by a rod 10′, the connections being such that as the lever is swung its motion will be communicated to the brake-beams in opposite directions, each rod serving as a fulcrum for the lever with reference to the beam connected with the other rod. Chains 11′ and 12′ or other suitable flexible connections are attached to the actuating-beam 5 and passed over guide-pulleys 13 13′, supported on the truck post or standard 14, these chains being connected with the brake-lever 9 by means of rods 11 and 12, so that an upward or downward movement of the beam 5 will be communicated through the chains, rods, and lever to the brakes 7 and 7′.

For actuating the brake-beams to bring the beams or the shoes thereon in contact with the car-wheels a brake-shaft 15 is mounted rotatably on the car-truck or car, it being shown in the drawings for convenience of illustration as so mounted on the standard 14. At the lower end of this shaft 15 it is provided with a crank-arm which is connected eccentrically by a link 16 to the brake-beam 5. The brake-shaft 15 is provided with means for rotating it, which may be a crank-handle 17. When it is desired to force the brakes against the wheels, the shaft 15 is rotated, and thereby the brake-beam 5, at that extremity, at least, near which the post is connected thereto, is forced against the adjacent car-wheel, and the motion of the car-wheel will carry that end of the brake-beam 5 with it either down or up, in accordance with the motion of the wheel, and thereby draw on the rod 11 or 12, acting to swing the lever 9, and thereby to draw the beams 7 7′ against the car-wheels adjacent thereto. On releasing the shaft 15 the elasticity of the hangers supporting the brake-beams will carry the brake-beams away from the wheels.

As an auxiliary means for applying the brake-beams 7 7′ to the car-wheels adjacent thereto we provide a collar 18, loose on an axle C, and connect this collar 18 by a chain 19 (which may, if desired, have a long rod-like link 19′) to the lever 9 at the other side from the middle thereof than at that which the brake-beams 7 and 7′ are connected. The collar 18 is provided with crown-teeth, and a complementary collar 18′, provided with complementary recesses, is fixed on the axle C, the two collars forming the complementary members of a clutch. The collar 18 is also provided with an annular groove therein, and a tilting lever 20, pivoted medially on the truck, rides at one end in the groove in the collar 18. The other extremity of the lever 20 is so disposed, preferably, as to be adapted to be actuated by the foot of the car attendant as a pedal, whereby the attendant can throw the member 18 into engagement with the member 18′, thereby compelling the member 18 to rotate with the axle, thus winding up the chain 19 and forcing the brake-beams 7 7′ into engagement with the adjacent car-wheels through the action of the lever 9 and the connecting-rods 10 10′.

While we have shown and described the brakes 7 and 7′ as being located in pairs and connected by means of the lever 9 in the manner indicated, it is obvious that any suitable means for communicating the motion of the actuating-brake to the other brakes would be within the scope of our invention, for various means for communicating motion from the actuating-brake will readily suggest themselves to any ordinary mechanic skilled in the art to which this invention pertains.

Having thus described our invention, what we claim as new, and desire to secure by Letters Patent, is—

1. The combination with the wheels of a car; brakes adapted to be applied thereto; an actuating-brake; a flexible support therefor, extended over one or more guides, and connected with the other brakes; and means for adjusting the actuating-brake into and out of contact with the car-wheels, said actuating-brake being adapted to move with the periphery of the car-wheel, and to communicate such motion through its supporting connections, to apply the other brakes.

2. The combination with the wheels of a car; brakes adapted to be applied thereto; an actuating-brake; supporting flexible connections therefor, extended over suitable guides at each side of the field of movement of said brake, and connected with the other brake; and means for adjusting the actuating-brake into and out of contact with a car-wheel; said actuating-brake being adapted to move in either direction with the periphery of the car-wheel, and to communicate such motion through its supporting connections to apply to the other brakes.

3. The combination with the wheels of a car; brakes adapted to be applied thereto; an actuating-brake supported by flexible connections, extending therefrom over guide-pulleys and connected with the other brakes; and means for adjusting the actuating-brake into and out of contact with a car-wheel; said actuating-brake being adapted to move with the periphery of the car-wheel and to communicate such motion to apply the other brakes.

In testimony whereof we affix our signatures in the presence of two witnesses.

JOHN N. ZECH.
NICHOLAS P. ZECH.

Witnesses:
JAS. B. ERWIN,
LEVERETT C. WHEELER.